US012746676B2

(12) United States Patent
Wang et al.

(10) Patent No.: US 12,746,676 B2
(45) Date of Patent: Sep. 29, 2026

(54) JOINT DIAGNOSIS METHOD AND APPARATUS, AND ROBOT

(71) Applicant: Elite Intelligent Robot Co., Ltd., Suzhou (CN)

(72) Inventors: Ke Wang, Jiangsu (CN); Kai Sun, Jiangsu (CN); Yunan Cao, Jiangsu (CN)

(73) Assignee: Elite Intelligent Robot Co., Ltd., Suzhou (CN)

( * ) Notice: Subject to any disclaimer, the term of this patent is extended or adjusted under 35 U.S.C. 154(b) by 0 days.

(21) Appl. No.: 19/165,839

(22) PCT Filed: Mar. 15, 2024

(86) PCT No.: PCT/CN2024/081899
§ 371 (c)(1),
(2) Date: Sep. 16, 2025

(87) PCT Pub. No.: WO2024/188337
PCT Pub. Date: Sep. 19, 2024

(65) Prior Publication Data

US 2026/0115918 A1 Apr. 30, 2026

(30) Foreign Application Priority Data

Mar. 16, 2023 (CN) ......................... 202310251703.0

(51) Int. Cl.
*B25J 9/16* (2006.01)
*B25J 17/00* (2006.01)

(52) U.S. Cl.
CPC ........... *B25J 9/1674* (2013.01); *B25J 9/1692* (2013.01); *B25J 17/00* (2013.01)

(58) Field of Classification Search
USPC .................................................. 700/245–264
See application file for complete search history.

(56) References Cited

U.S. PATENT DOCUMENTS

2012/0022690 A1* 1/2012 Ooga ..................... B25J 9/1633 700/258
2014/0201571 A1* 7/2014 Hosek .................... B25J 9/1674 714/26

(Continued)

FOREIGN PATENT DOCUMENTS

CA 2887038 A1 * 5/2014 ................ B25J 9/16
CN 106994686 A 8/2017

(Continued)

OTHER PUBLICATIONS

International Search Report and Written Opinion (with English translation) received in corresponding Application No. PCT/CN2024/081899, dated May 20, 2024, 17 pages.

(Continued)

*Primary Examiner* — Jonathan L Sample
(74) *Attorney, Agent, or Firm* — Dority & Manning, PA

(57) ABSTRACT

A joint diagnosis method, including steps: collecting data of a current motion trajectory of a robot, solving for a frictional force of a joint, performing temperature compensation on a friction model based on a feedback temperature of the joint, and solving for an output torque of a connecting rod of the joint, to acquire a dynamics model error; performing detection and analysis on the dynamics model error, to acquire modal analysis and joint wear degree results; and determining, based on the modal analysis and joint wear degree results, whether the joint is in an abnormal wear state, and if the joint is in the abnormal wear state, triggering a joint abnormity alarm, otherwise, performing calibration on the friction model.

10 Claims, 6 Drawing Sheets

(56) References Cited

U.S. PATENT DOCUMENTS

| | | | | |
|---|---|---|---|---|
| 2017/0348855 | A1* | 12/2017 | Abe | B25J 9/1674 |
| 2019/0099886 | A1* | 4/2019 | Chattopadhyay | G05B 23/024 |
| 2022/0176546 | A1* | 6/2022 | Smith | B25J 13/085 |
| 2022/0176558 | A1* | 6/2022 | Smith | B25J 9/1643 |

FOREIGN PATENT DOCUMENTS

| | | | | | |
|---|---|---|---|---|---|
| CN | 108608426 | A | | 10/2018 | |
| CN | 109702745 | A | | 5/2019 | |
| CN | 112528434 | A | | 3/2021 | |
| CN | 113742865 | A | | 12/2021 | |
| CN | 115389240 | A | | 11/2022 | |
| CN | 116021554 | A | * | 4/2023 | B25J 9/1674 |
| WO | WO-2013050314 | A1 | * | 4/2013 | G01N 19/08 |
| WO | WO 2021086106 | A1 | | 5/2021 | |

OTHER PUBLICATIONS

Office Action and Search Report (with English translation) received in corresponding Application No. CN 202310251703.0, dated May 8, 2023, 17 pages.

* cited by examiner

JOINT DIAGNOSIS METHOD AND APPARATUS, AND ROBOT

CROSS-REFERENCE TO RELATED APPLICATIONS

This application is the U.S. National Stage entry of International Application No. PCT/CN2024/081899, filed on Mar. 15, 2024, which, in turn, claims priority to CN patent application No. 202310251703.0, filed on Mar. 16, 2023, both of which are hereby incorporated herein by reference in their entireties for all purposes.

TECHNICAL FIELD

The present disclosure relates to the field of robotics technology, and more specifically to a joint diagnosis method and apparatus, and robot.

BACKGROUND

With the rapid development of robotics technology, the application of robotics technology in industrial production has become increasingly widespread. However, most of prior joint friction models are identified only once before leaving the factory. Complex friction phenomena exists between the gears, bearings, and other transmission structures disposed inside a robot joint, which may lead to joint wear, causing a frictional force of the joint to change accordingly, with errors of the originally identified friction model increasing, thereby affecting the accuracy of the models.

Therefore, it is necessary to provide a method for improving the accuracy of external torque estimation and for real time monitoring of joint operating state.

SUMMARY

In order to solve the aforementioned problems, the present disclosure provides a joint diagnosis method, including steps:

S100, collecting data of a current motion trajectory of a robot, solving for a frictional force of a joint, performing temperature compensation on a friction model based on a feedback temperature of the joint, and solving for an output torque of a linkage of the joint, to acquire a dynamics model error;

S200, performing detection and analysis on the dynamics model error, to acquire modal analysis and joint wear degree results;

S300, determining, based on the modal analysis and joint wear degree results, whether the joint is in an abnormal wear state, and if the joint is in the abnormal wear state, triggering a joint abnormity alarm, otherwise, performing calibration on the friction model;

in a process of the detection and analysis of the dynamics model error, performing an FFT transform on the dynamics model error firstly, acquiring a signal amplitude of a modal that is greater than a frequency f in the dynamics model error based on the FFT transform results, and determining whether the signal amplitude exceeds a set first threshold t1;

if the signal amplitude exceeds the set first threshold t1, the joint is in the abnormal wear state, triggering the joint abnormity alarm, and prompting for necessity for joint replacement; and if the signal amplitude does not exceed the set first threshold t1, further determining whether the dynamics model error exceeds a second threshold t2;

if the dynamics model error does not exceed the second threshold t2, it is indicated that a state of the current joint is normal and the dynamics model is acceptable, the joint is not in the abnormal wear state, and there is no necessity for calibration on the friction model, also executing the step S100; and if the dynamics model error exceeds the second threshold t2, further determining whether the dynamics model error exceeds k times the calculated value of the friction model stored in the current joint;

if the dynamics model error exceeds k times for the friction model stored in the current joint, it is indicated that the current joint is in the abnormal wear state, triggering the joint abnormity alarm, and prompting for necessity for joint replacement; and if the dynamics model error does not exceed k times for the friction model stored in the current joint, it is indicated that the joint is in a normal wear state, and an operation of performing calibration on the friction model is required;

the performing calibration on the friction model including at least steps: executing a calibration trajectory by the joint of the robot and collecting the motion feedback data of the robot in real time, filtering the motion feedback data, extracting friction torques of joints at different velocity segments, solving for online calibrated parameters of the friction model, and storing the parameters of the friction model into the joint of the robot.

The present disclosure further provides a joint diagnosis apparatus, including:

a robot dynamics model calculation device configured for realizing functions of acquiring feedback data, calculating for linkage dynamics for the robot, calculating a frictional force, performing temperature compensation, and calculating a model error;

a joint abnormity detection device configured for detecting and determining whether a joint is in an abnormal wear state, and if the joint is in the abnormal wear state, triggering a joint abnormity alarm, otherwise, performing calibration on a friction model;

a friction model calibration device configured for executing a calibration trajectory, filtering motion feedback data, and solving for calibrated parameters of the friction model based on the motion data of the robot;

a joint abnormity alarm device configured for conveying a warning message to users about replacing the joint;

in a process of the detection and analysis of the dynamics model error, performing an FFT transform on the dynamics model error firstly, acquiring a signal amplitude of a modal that is greater than a frequency f in the dynamics model error based on the FFT transform results, and determining whether the signal amplitude exceeds a set first threshold t1;

if the signal amplitude exceeds the set first threshold t1, the joint is in the abnormal wear state, triggering the joint abnormity alarm, and prompting for necessity for joint replacement; and if the signal amplitude does not exceed the set first threshold t1, further determining whether the dynamics model error exceeds a second threshold t2;

if the dynamics model error does not exceed the second threshold t2, it is indicated that a state of the current joint is normal and the dynamics model is acceptable, the joint is not in the abnormal wear state, and there is no necessity for calibration on the friction model, also executing the step S100; and if the dynamics model error exceeds the second threshold t2, further determining whether the dynamics model error exceeds k times the calculated value of the friction model stored in the current joint;

if the dynamics model error exceeds k times for the friction model stored in the current joint, it is indicated that the current joint is in the abnormal wear state, triggering the joint abnormity alarm, and prompting for necessity for joint replacement; and if the dynamics model error does not exceed k times for the friction model stored in the current joint, it is indicated that the joint is in a normal wear state, and an operation of performing calibration on the friction model is required;

the performing calibration on the friction model including at least steps: executing a calibration trajectory by the joint of the robot and collecting the motion feedback data of the robot in real time, filtering the motion feedback data, extracting friction torques of joints at different velocity segments, solving for online calibrated parameters of the friction model, and storing the parameters of the friction model into the joint of the robot.

The present disclosure further provides a robot including the aforementioned joint diagnosis apparatus.

Compared with the prior art, the beneficial effects of the present disclosure are as follows:

(1) the present disclosure detects and analyzes the dynamics model error through a set joint modal detection module and a set joint wear degree detection module, for a time domain and a frequency domain, respectively. In a process of the detection and analysis of the dynamics model error, performing an FFT transform on the dynamics model error firstly, acquiring a signal amplitude of a modal that is greater than a frequency f in the dynamics model error based on the FFT transform results. Further comparing the signal amplitude with different thresholds, determining whether performing calibration on the friction model is needed based on magnitudes of the dynamics model error and k times (k>1) for the friction model stored in the current joint. The various components work together, which is beneficial to improving the accuracy of the friction model of the joint;

(2) in the process of the performing calibration on the friction model, filtering the motion feedback data collected in real time, that is, performing a forward low-pass filtering on the data to be filtered firstly, and then performing a low-pass filtering with the same cutoff frequency in a reversed order on the data after the forward low-pass filtering, so that the delays caused by the low-pass filtering may cancel each other out, which is beneficial to extracting friction torques of joints at different velocity segments with higher accuracy;

(3) the joint diagnosis method provided by the present disclosure does not require cumbersome disassembly identification, capable of online performing calibration on the friction model of the joint under normal wear state of the entire machine, improving the accuracy of the external torque estimation, thereby reducing the probability of false alarms in collision detection and enhancing the dragging experience. Additionally, it may also detect the operating state of the joint in real time to timely identify joint failures and provide alarm prompts for joint replacement.

BRIEF DESCRIPTION OF DRAWINGS

To more clearly describe the technical solutions in the embodiments of the present disclosure or the prior art, the drawings required for describing the embodiments or the prior art are introduced briefly below. It is obvious that the drawings described below involve merely some of embodiments of the present disclosure, and other drawings may be derived based on these drawings without inventive efforts, for those skilled in the art.

DETAILED DESCRIPTION OF THE EMBODIMENTS

In order to enable those skilled in the art to better understand the technical solutions of the present disclosure, the technical solutions in the embodiments of the present disclosure will be described clearly and completely below with reference to the drawings in the embodiments of the present disclosure. Obviously, the described embodiments are only part of the embodiments of the present disclosure, not all of the embodiments. All other embodiments derived by those skilled in the art based on the embodiments of the present disclosure without making inventive efforts shall fall within the scope of protection of the present disclosure.

It should be noted that the terms "first" and "second" and the like in the specification and claims of the present disclosure and the aforementioned drawings are used to distinguish between similar objects and are not necessarily used to describe a specific order or sequence. It should be understood that numbers used in this way may be interchanged in appropriate circumstances, so that the embodiments of the present disclosure described here may be implemented in an order other than those illustrated or described here. In addition, the terms "including", "comprising" and any of their variations are intended to cover non-exclusive inclusions. For example, a process, method, system, product, or device including a series of steps or units is not limited to those steps or units that are clearly listed, but may also include other steps or units that are not clearly listed or that are inherent to the process, method, product, or device.

Figure 1:
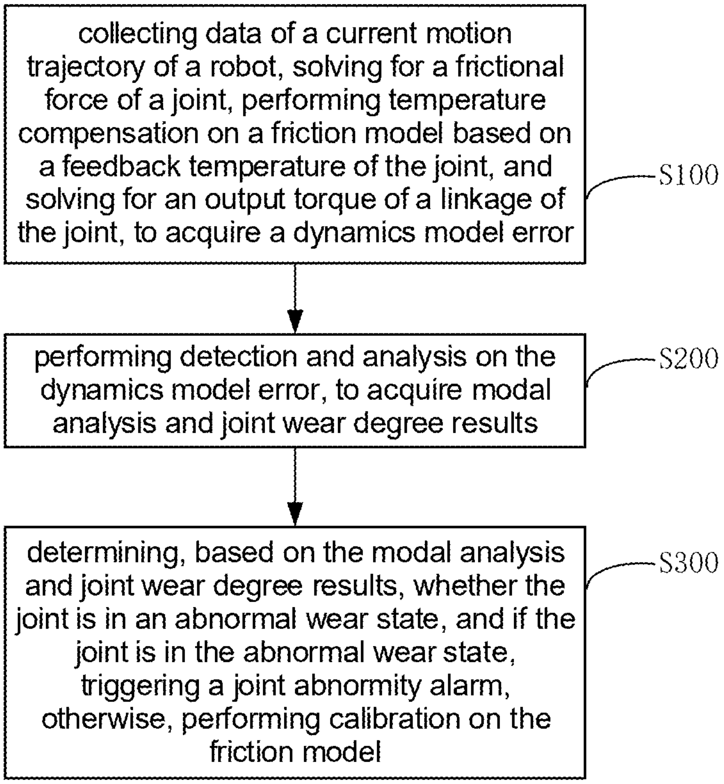
FIG. 1 shows a schematic flowchart of a joint diagnosis method based on current feedback according to the present disclosure.

FIG. 1 shows a schematic flowchart of a joint diagnosis method according to an embodiment of the present disclosure, which may be applicable to joint diagnosis scenarios. This method may be executed by a joint diagnosis apparatus, which may be implemented in the form of hardware and/or software, and may also be configured in an electronic device.

As shown in FIG. 1, an embodiment of the present disclosure provides a joint diagnosis method, including steps:

S100, collecting data of a current motion trajectory of a robot, solving for the frictional force of a joint, performing temperature compensation on a friction model based on a feedback temperature of the joint, and solving for an output torque of a linkage of the joint, to acquire a dynamics model error;

S200, performing detection and analysis on the dynamics model error, to acquire modal analysis and joint wear degree results;

S300, determining, based on the modal analysis and joint wear degree results, whether the joint is in an abnormal wear state, and if the joint is in the abnormal wear state, triggering a joint abnormity alarm, otherwise, performing calibration on the friction model.

Figure 2:
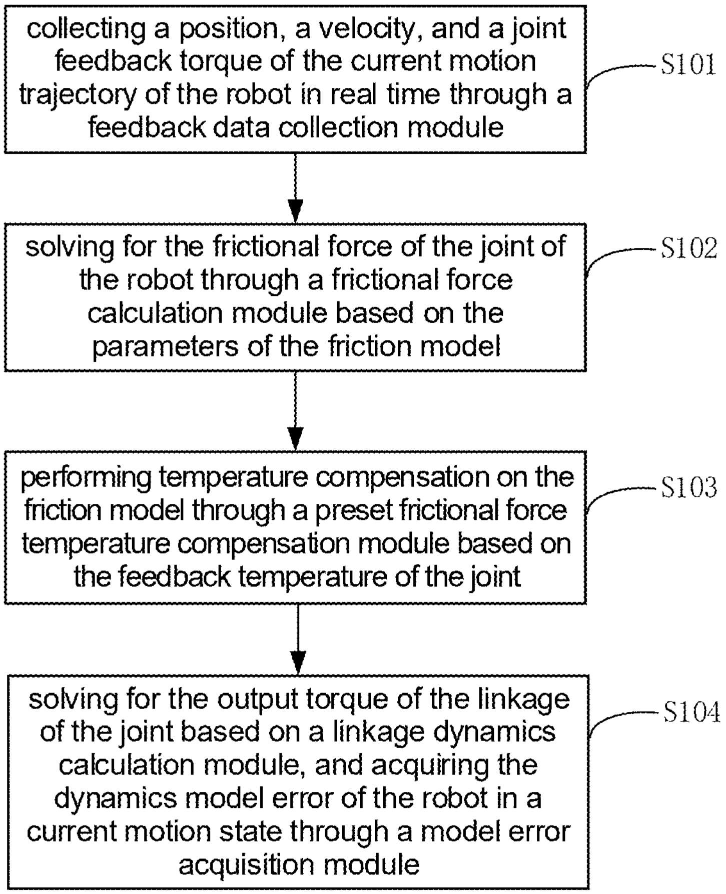
FIG. 2 shows a flowchart of step S100 of a joint diagnosis method according to the present disclosure.

FIG. 2 shows a flowchart of step S100 of a joint diagnosis method according to the present disclosure. As shown in FIG. 2, the step S100 specifically includes steps:

S101, collecting a position, a velocity, and a joint feedback torque of the current motion trajectory of the robot in real time through a feedback data collection module.

Further, collecting the position q, the velocity $\dot{q}$, and the joint feedback torque $\tau_{motor}$ of the current motion trajectory of the robot in real time through a preset feedback data collection module to prepare for calculation for the dynamics model. The joint feedback torque $\tau_{motor}$ is derived from a joint feedback current $I_{motor}$ and a joint torque sensitivity coefficient $k_i$, represented by an equation as below:

$$\tau_{motor} = k_t I_{motor}. \tag{1}$$

S102, solving for the frictional force of the joint of the robot through a frictional force calculation module based on the parameters of the friction model.

In solving for the frictional force of the joint, the friction model includes but is not limited to the Stribeck model, Coulomb-viscous model, Dahl model, and LuGre model.

Further, in specific embodiments, the Stribeck model is used as the friction model, and the joint frictional force is represented by an equation as below:

$$\tau_f = \left[f_c + (f_s - f_c)e^{-\left|\frac{\dot{q}}{v_s}\right|^{\alpha}}\right]\mathrm{sgn}(\dot{q}) + f_v\dot{q} \tag{2}$$

in equation (2), $f_c$ is a Coulomb friction, $f_s$ is a maximum static friction, $v_s$ is a Stribeck effect velocity, $\alpha$ is an empirical coefficient related to a reducer type, $f_v$ is a viscous frictional force coefficient, sgn( ) is a sign function, and $\dot{q}$ is a velocity of the joint of the robot.

S103, performing temperature compensation on the friction model through a preset frictional force temperature compensation module based on the feedback temperature of the joint.

Further, since lubrication conditions of the reducer of the joint of the robot vary at different temperatures, it is necessary to perform temperature compensation on different friction models. The temperature compensation is carried out through a frictional force temperature compensation model, represented by an equation as below:

$$\tau_{f,T} = f(\dot{q}, T) \tag{3}$$

in equation (3), $\tau_{f,T}$ is an impact value of the temperature on the frictional force, f( ) is a nonlinear function representing the temperature compensation model, $\dot{q}$ is the velocity of the joint of the robot, and T is a temperature feedback value of the reducer of the joint.

The calculated value of the frictional force after the temperature compensation is represented by an equation as below:

$$\tau_{f,total} = \tau_f + \tau_{f,T}. \tag{4}$$

S104, solving for the output torque of the linkage of the joint based on a linkage dynamics calculation module, and acquiring the dynamics model error of the robot in a current motion state through a model error acquisition module.

Further, the output torque of the linkage of the joint is calculated, as represented by an equation below:

$$\tau_{link} = M(q)\ddot{q} + C(q, \dot{q})\dot{q} + G(q) \tag{5}$$

in equation (5), $\tau_{link}$ is the output torque of the linkage of the joint, M(q) is an inertia parameter matrix of the robot, $C(q,\dot{q})$ is a centrifugal force and Coriolis force terms, and G(q) is a gravity torque. Since the dynamics parameters of the linkage have been identified as a whole before the robot leaves the factory, the dynamics error of the linkage of the robot may be considered as 0.

Further, in the model error acquisition module, the dynamics model error is derived based on the joint feedback torque, the frictional force after the temperature compensation, and the output torque of the linkage of the joint, as represented by an equation below:

$$\tau_{err} = \tau_{motor} - \tau_{link} - \tau_{f,total}. \tag{6}$$

In the step S200 of the present disclosure, performing detection and analysis on the dynamics model error refers to performing detection and analysis on the dynamics model error through a joint modal detection module and a joint wear degree detection module, for a time domain and a frequency domain, respectively.

In the step S300 of the present disclosure, determining, based on the modal analysis and joint wear degree results, whether the joint is in an abnormal wear state, and if the joint is in the abnormal wear state, triggering a joint abnormity alarm, otherwise, performing calibration on the friction model.

Figure 3:
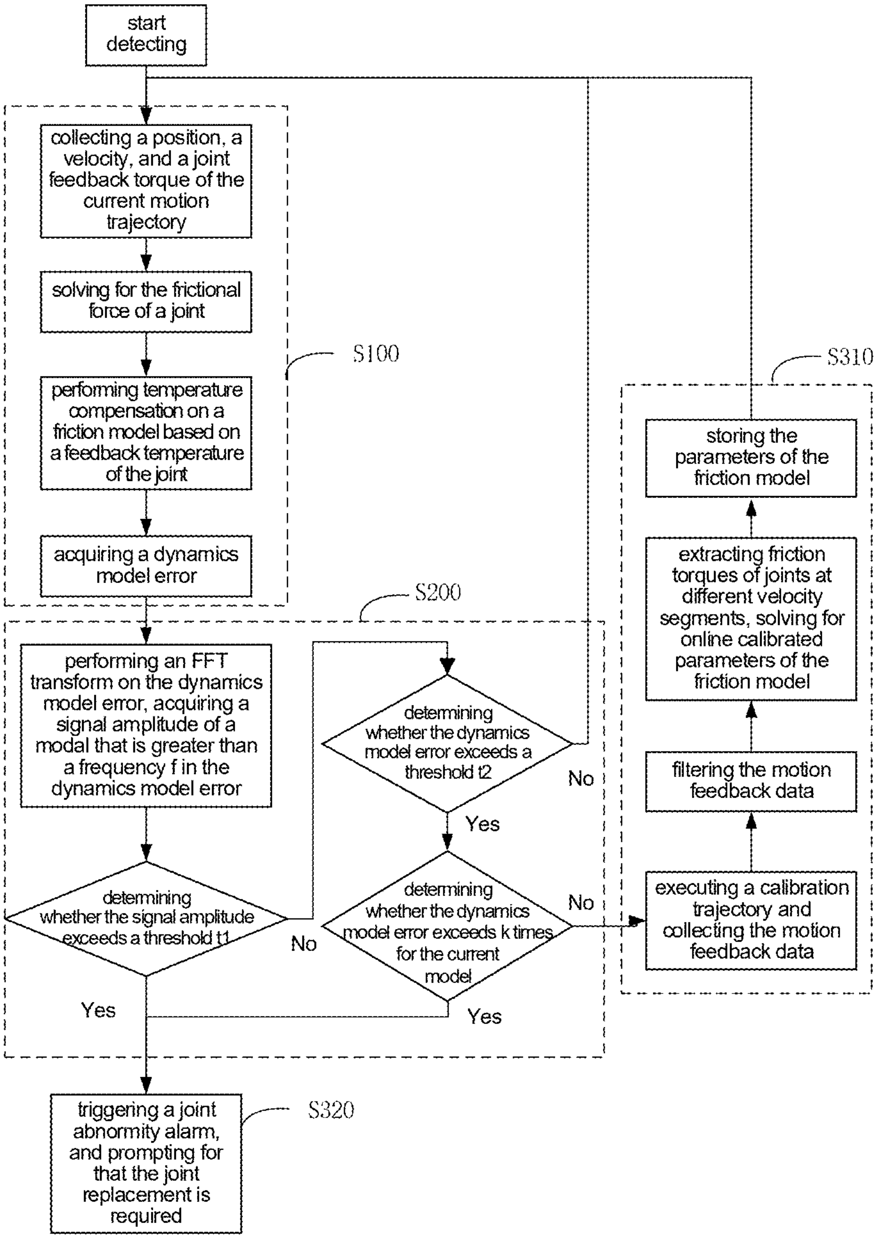
FIG. 3 shows another flowchart of a joint diagnosis method according to the present disclosure.

FIG. 3 shows another flowchart of a joint diagnosis method according to the present disclosure. As shown in FIG. 3, in a process of the detection and analysis of the dynamics model error, performing an FFT transform on the dynamics model error firstly, acquiring a signal amplitude of a modal that is greater than a frequency f in the dynamics model error based on the FFT transform results, and determining whether the signal amplitude exceeds a set first threshold t1.

The FFT transform, is an efficient algorithm for DFT, referred to as the Fast Fourier Transform. The FFT transform is one of the most fundamental methods in time-domain-to-frequency-domain transformation analysis.

If the signal amplitude exceeds the set first threshold t1, the joint is in the abnormal wear state, triggering the joint abnormity alarm, and prompting for necessity for joint replacement; and if the signal amplitude does not exceed the set first threshold t1, further determining whether the dynamics model error exceeds a second threshold t2.

If the dynamics model error does not exceed the second threshold t2, it is indicated that a state of the current joint is normal and the dynamics model is acceptable, the joint is not in the abnormal wear state, and there is no necessity for calibration on the friction model, also executing the step S100; and if the dynamics model error exceeds the second threshold t2, it is necessary to further determine whether the dynamics model error exceeds k times (k>1) the calculated value of the friction model stored in the current joint.

If the dynamics model error exceeds k times for the friction model stored in the current joint, it is indicated that a wear degree of the current joint is relatively severe and the current joint is in the abnormal wear state, triggering the joint abnormity alarm, and prompting for necessity for joint replacement; and if the dynamics model error does not exceed k times for the friction model stored in the current joint, it is indicated that the joint is in a normal wear state, and at this time the model error is relatively large, and an operation of performing calibration on the friction model is required.

As shown in FIG. 3, the performing calibration on the friction model specifically includes steps:

S310, executing a calibration trajectory by the joint of the robot and collecting the motion feedback data of the robot in real time, filtering the motion feedback data, extracting friction torques of joints at different velocity segments, solving for online calibrated parameters of the friction model, and storing the parameters of the friction model into the joint of the robot.

Figure 4:
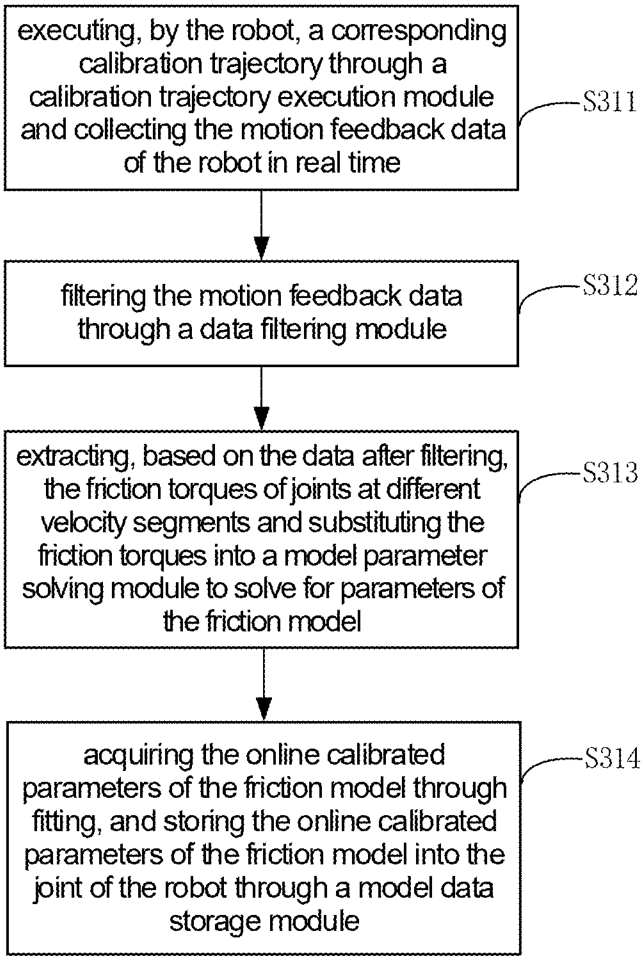
FIG. 4 shows a flowchart of step S310 of a joint diagnosis method according to the present disclosure.
Figure 5:
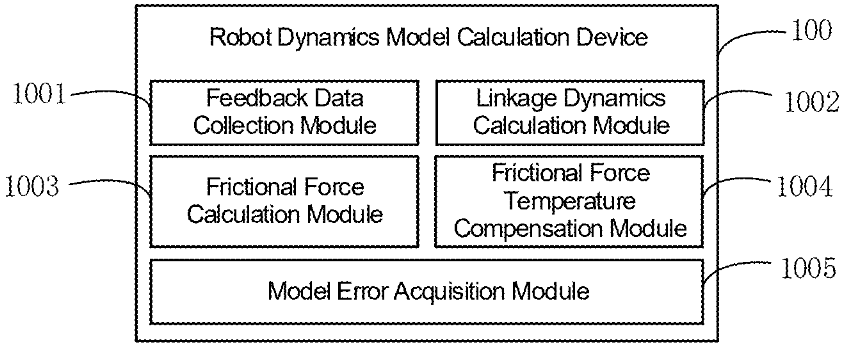
FIG. 5 shows a schematic diagram of a robot dynamics model calculation device in a joint diagnosis apparatus according to the present disclosure.
Figure 6:
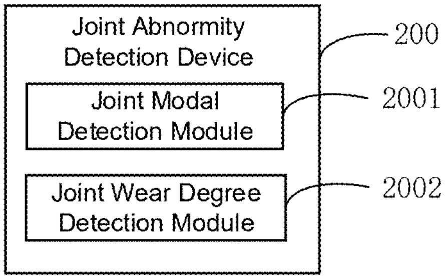
FIG. 6 shows a schematic diagram of a joint abnormity detection device in a joint diagnosis apparatus according to the present disclosure.
Figure 7:
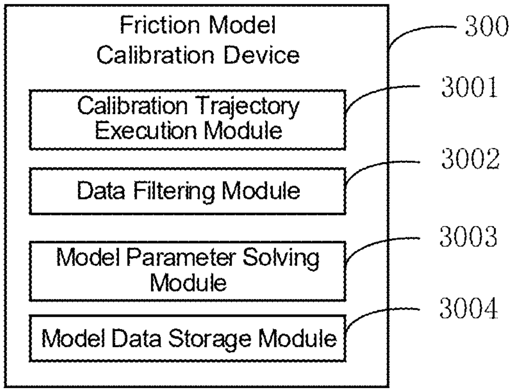
FIG. 7 shows a schematic diagram of a friction model calibration device in a joint diagnosis apparatus according to the present disclosure.
Figure 8:
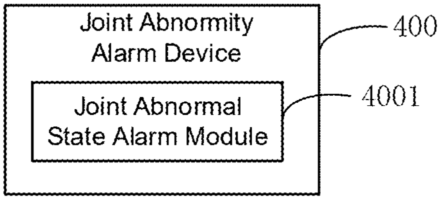
FIG. 8 shows a schematic diagram of a joint abnormity alarm device in a joint diagnosis apparatus according to the present disclosure.

FIG. 4 shows a flowchart of step S310 of a joint diagnosis method according to the present disclosure. As shown in FIG. 4, the step S310 includes at least steps:

S311, executing, by the robot, a corresponding calibration trajectory through a calibration trajectory execution module and collecting the motion feedback data of the robot in real time.

Further, the calibration trajectory is a motion trajectory at multi-velocity segments. While the calibration trajectory is executed by the joint of the robot, the feedback data including feedback position, feedback velocity, and joint feedback torque is recorded.

S312, filtering the motion feedback data through a data filtering module.

Further, the filtering is a zero-delay low-pass filtering.

Further, the zero-delay low-pass filtering refers to performing a forward low-pass filtering on the data to be filtered firstly, and then performing a low-pass filtering with the same cutoff frequency in a reversed order on the data after the forward low-pass filtering, so that the delays caused by the low-pass filtering may cancel each other out.

S313, extracting, based on the data after filtering, the friction torques of joints at different velocity segments and substituting the friction torques into a model parameter solving module to solve for parameters of the friction model.

Based on the data after filtering, the friction torques of joints at different velocity segments are extracted. The extraction of friction torques at different velocity segments are represented by an equation as below:

$$\tau_f(\pm\dot{q}) = \pm(\tau^+_{motor} - \tau^-_{motor})/2 \tag{7}$$

in equation (7), $$\tau^+_{motor}$$

is the torque applied while the joint moves forward, and $$\tau^-_{motor}$$

motor is the torque applied while the joint moves backward.

S314, acquiring the online calibrated parameters of the friction model through fitting, and storing the online calibrated parameters of the friction model into the joint of the robot through a model data storage module.

Further, the fitting is performed on equation (2) by using a fitting algorithm to obtain the calibrated parameters of the friction model, and the fitting algorithm includes but is not limited to the nonlinear least squares method.

Further, as shown in FIG. 3, when the joint is in the abnormal wear state, triggering the joint abnormity alarm, and prompting for necessity for joint replacement includes a step:

S320, triggering the joint abnormity alarm, and issuing externally an alarm by a joint abnormal state alarm module, prompting for that the state of the current joint is abnormal and the replacement is required.

The joint diagnosis method provided by the present disclosure does not require cumbersome disassembly identification, capable of online performing calibration on the friction model of the joint under normal wear state of the entire machine, improving the accuracy of the external torque estimation, thereby reducing the probability of false alarms in collision detection and enhancing the dragging experience. Additionally, it may also detect the operating state of the joint in real time to timely identify joint failures and provide alarm prompts for joint replacement.

FIG. 5 to FIG. 8 are structural block diagrams of a joint diagnosis apparatus according to the present disclosure, and the embodiment may be applicable to joint diagnosis scenarios. The apparatus may be implemented in the form of hardware and/or software, and may be integrated into a computer device with application development functions.

As shown in FIG. 5 to FIG. 8, the joint diagnosis apparatus includes: a robot dynamics model calculation device 100 configured for realizing functions of acquiring feedback data, calculating for linkage dynamics for the robot, calculating a frictional force, performing temperature compensation, and calculating a model error; a joint abnormity detection device 200 configured for detecting and determining whether a joint is in an abnormal wear state, and if the joint is in the abnormal wear state, triggering a joint abnormity alarm, otherwise, performing calibration on a friction model; a friction model calibration device 300 configured for executing a calibration trajectory, filtering motion feedback data, and solving for calibrated parameters of the friction model based on the motion data of the robot; a joint abnormity alarm device 400 configured for conveying a warning message to users about replacing the joint, including but not limited to devices such as loudspeakers, electronic displays, etc.

Further, the robot dynamics model calculation device 100 includes a feedback data collection module 1001, a linkage dynamics calculation module 1002, a frictional force calculation module 1003, a frictional force temperature compensation module 1004, and a model error acquisition module 1005, where the joint abnormity detection device 200 includes a joint modal detection module 2001 and a joint wear degree detection module 2002; the friction model calibration device 300 includes a calibration trajectory execution module 3001, a data filtering module 3002, a model parameter solving module 3003, and a model data storage module 3004; the joint abnormity alarm device 400 includes a joint abnormal state alarm module 4001.

The embodiment of the present disclosure further discloses a robot, including: the aforementioned joint diagnosis apparatus.

It should be noted that the robot described in the embodiments of the present disclosure is a robot that applies the aforementioned joint diagnosis apparatus. Therefore, all embodiments of the aforementioned joint diagnosis apparatus are applicable to the robot and can achieve the same or similar beneficial effects.

It should be understood that various forms of the processes shown above may be used, including reordering, adding, or deleting steps. For example, the steps described in the present disclosure may be executed in parallel, sequentially, or in different orders, as long as the desired results of the technical solution of the present disclosure may be achieved. The present disclosure does not impose any restrictions in this regard.

The aforementioned specific embodiments do not constitute a limitation on the scope of protection of the present disclosure. Those skilled in the art should understand that various modifications, combinations, sub-combinations, and substitutions may be made based on design requirements and other factors. Any modifications, equivalent substitutions, and improvements made within the spirit and principles of the present disclosure should be included within the scope of protection of the present disclosure.

The invention claimed is:

1. A joint diagnosis method, characterized by comprising steps:

collecting data of a current motion trajectory of a robot, solving for a frictional force of a joint, performing temperature compensation on a friction model based on a feedback temperature of the joint, and solving for an output torque of a linkage of the joint, to acquire a dynamics model error;

performing detection and analysis on the dynamics model error, to acquire modal analysis and joint wear degree results;

determining, based on the modal analysis and joint wear degree results, whether the joint is in an abnormal wear state, and if the joint is in the abnormal wear state, triggering a joint abnormity alarm, otherwise, performing calibration on the friction model;

in a process of the detection and analysis of the dynamics model error, performing an FFT transform on the dynamics model error firstly, acquiring a signal amplitude of a modal that is greater than a frequency f in the dynamics model error based on the FFT transform results, and determining whether the signal amplitude exceeds a set first threshold t1;

if the signal amplitude exceeds the set first threshold t1, the joint is in the abnormal wear state, triggering the joint abnormity alarm, and prompting for necessity for joint replacement; and if the signal amplitude does not exceed the set first threshold t1, further determining whether the dynamics model error exceeds a second threshold t2;

if the dynamics model error does not exceed the second threshold t2, it is indicated that a state of the current joint is normal and the dynamics model is acceptable, the joint is not in the abnormal wear state, and there is no necessity for calibration on the friction model, also executing the collecting step; and if the dynamics model error exceeds the second threshold t2, further determining whether the dynamics model error exceeds k times the calculated value of the friction model stored in the current joint;

if the dynamics model error exceeds k times for the friction model stored in the current joint, it is indicated that the current joint is in the abnormal wear state, triggering the joint abnormity alarm, and prompting for necessity for joint replacement; and if the dynamics model error does not exceed k times for the friction model stored in the current joint, it is indicated that the joint is in a normal wear state, and an operation of performing calibration on the friction model is required;

the performing calibration on the friction model comprising at least steps: executing a calibration trajectory by the joint of the robot and collecting the motion feedback data of the robot in real time, filtering the motion feedback data, extracting friction torques of joints at different velocity segments, solving for online calibrated parameters of the friction model, and storing the parameters of the friction model into the joint of the robot.

2. The joint diagnosis method according to claim 1, characterized in that the collecting step comprises:

collecting a position, a velocity, and a joint feedback torque of the current motion trajectory of the robot in real time through a feedback data collection module;

solving for the frictional force of the joint of the robot through a frictional force calculation module based on the parameters of the friction model;

performing temperature compensation on the friction model through a preset frictional force temperature compensation module based on the feedback temperature of the joint;

solving for the output torque of the linkage of the joint based on a linkage dynamics calculation module, and acquiring the dynamics model error of the robot in a current motion state through a model error acquisition module.

3. The joint diagnosis method according to claim 1, characterized in that performing detection and analysis on the dynamics model error in the performing step is performing detection and analysis on the dynamics model error through a joint modal detection module and a joint wear degree detection module, for a time domain and a frequency domain, respectively.

4. The joint diagnosis method according to claim 1, characterized in that the executing a calibration trajectory by the joint of the robot and collecting the motion feedback data of the robot in real time, filtering the motion feedback data, extracting friction torques of joints at different velocity segments, solving for online calibrated parameters of the friction model, and storing the parameters of the friction model into the joint of the robot specifically includes:

executing, by the robot, a corresponding calibration trajectory through a calibration trajectory execution module and collecting the motion feedback data of the robot in real time;

filtering the motion feedback data through a data filtering module;

extracting, based on the data after filtering, the friction torques of joints at different velocity segments and substituting the friction torques into a model parameter solving module to solve for parameters of the friction model;

acquiring the online calibrated parameters of the friction model through fitting, and storing the online calibrated parameters of the friction model into the joint of the robot through a model data storage module.

5. The joint diagnosis method according to claim 4, characterized in that the calibration trajectory is a motion trajectory at multi-velocity segments.

6. The joint diagnosis method according to claim 1, characterized in that the joint abnormity alarm in the determining step at least comprises a step: triggering the joint abnormity alarm, and issuing an alarm, by a joint abnormal state alarm module, prompting for that the state of the current joint is abnormal and the replacement is required.

7. A joint diagnosis apparatus, characterized by comprising:

a robot dynamics model calculation device configured for realizing functions of acquiring feedback data, calculating for linkage dynamics for the robot, calculating a frictional force, performing temperature compensation, and calculating a model error;

a joint abnormity detection device configured for detecting and determining whether a joint is in an abnormal wear state, and if the joint is in the abnormal wear state, triggering a joint abnormity alarm, otherwise, performing calibration on a friction model;

a friction model calibration device configured for executing a calibration trajectory, filtering motion feedback data, and solving for calibrated parameters of the friction model based on the motion data of the robot;

a joint abnormity alarm device configured for conveying a warning message to users about replacing the joint;

in a process of the detection and analysis of the dynamics model error, performing an FFT transform on the dynamics model error firstly, acquiring a signal amplitude of a modal that is greater than a frequency f in the dynamics model error based on the FFT transform results, and determining whether the signal amplitude exceeds a set first threshold t1;

if the signal amplitude exceeds the set first threshold t1, the joint is in the abnormal wear state, triggering the joint abnormity alarm, and prompting for necessity for joint replacement; and if the signal amplitude does not exceed the set first threshold t1, further determining whether the dynamics model error exceeds a second threshold t2;

if the dynamics model error does not exceed the second threshold t2, it is indicated that a state of the current joint is normal and the dynamics model is acceptable, the joint is not in the abnormal wear state, and there is no necessity for calibration on the friction model, also executing the collecting step; and if the dynamics model error exceeds the second threshold t2, further determining whether the dynamics model error exceeds k times the calculated value of the friction model stored in the current joint;

if the dynamics model error exceeds k times for the friction model stored in the current joint, it is indicated that the current joint is in the abnormal wear state, triggering the joint abnormity alarm, and prompting for necessity for joint replacement; and if the dynamics model error does not exceed k times for the friction model stored in the current joint, it is indicated that the joint is in a normal wear state, and an operation of performing calibration on the friction model is required; and the performing calibration on the friction model comprising at least steps: executing a calibration trajectory by the joint of the robot and collecting the motion feedback data of the robot in real time, filtering the motion feedback data, extracting friction torques of joints at different velocity segments, solving for online calibrated parameters of the friction model, and storing the parameters of the friction model into the joint of the robot.

8. The joint diagnosis apparatus according to claim 7, characterized in that the robot dynamics model calculation device comprises a feedback data collection module, a linkage dynamics calculation module, a frictional force calculation module, a frictional force temperature compensation module, and a model error acquisition module, wherein the joint abnormity detection device comprises a joint modal detection module and a joint wear degree detection module; the friction model calibration device comprises a calibration trajectory execution module, a data filtering module, a model parameter solving module, and a model data storage module; and the joint abnormity alarm device comprises a joint abnormal state alarm module.

9. A robot, characterized by comprising the joint diagnosis apparatus according to claim 7.

10. A robot, characterized by comprising the joint diagnosis apparatus according to claim 8.

* * * * *